United States Patent [19]

Savelli

[11] Patent Number: 5,707,676

[45] Date of Patent: Jan. 13, 1998

[54] PROCESS FOR MAKING FROZEN BAGEL SHAPES

[75] Inventor: Ronald Savelli, Littleton, Colo.

[73] Assignee: Einstein Bros. Bagels, Inc., Golden, Colo.

[21] Appl. No.: 613,472

[22] Filed: Mar. 11, 1996

[51] Int. Cl.$^6$ .................................................. A21D 10/02
[52] U.S. Cl. ........................... 426/549; 426/19; 426/94; 426/496; 426/499; 426/524
[58] Field of Search ........................ 426/19, 21, 94, 426/549, 25, 496, 499, 524

[56] References Cited

U.S. PATENT DOCUMENTS

| | | |
|---|---|---|
| 2,479,171 | 8/1949 | Lamperti . |
| 3,053,666 | 9/1962 | Henika et al. . |
| 3,404,989 | 10/1968 | Hirtensteiner . |
| 3,494,770 | 2/1970 | Smerak et al. . |
| 3,578,462 | 5/1971 | Smerak et al. . |
| 4,020,184 | 4/1977 | Chesner . |
| 4,044,154 | 8/1977 | Hoseney et al. . |
| 4,390,555 | 6/1983 | Levinson . |
| 4,657,769 | 4/1987 | Petrofsky et al. . |
| 4,842,876 | 6/1989 | Anderson et al. . |
| 4,882,984 | 11/1989 | Eves, II . |
| 4,957,750 | 9/1990 | Cochran et al. . |
| 5,035,904 | 7/1991 | Huang et al. . |
| 5,045,333 | 9/1991 | Petrofsky et al. . |
| 5,045,660 | 9/1991 | Levinson . |
| 5,066,505 | 11/1991 | Vos et al. . |
| 5,104,669 | 4/1992 | Wolke et al. . |
| 5,110,614 | 5/1992 | Corbin et al. . |
| 5,131,835 | 7/1992 | Rini et al. . |
| 5,236,724 | 8/1993 | Burger . |
| 5,260,082 | 11/1993 | delValle et al. . |
| 5,266,345 | 11/1993 | Corbin et al. . |
| 5,318,785 | 6/1994 | DeStefanis . |
| 5,346,715 | 9/1994 | Fertel . |
| 5,351,607 | 10/1994 | Rini et al. . |

OTHER PUBLICATIONS

Accord, Deb. *The News Observer*, "Bagels: Bigger than ever." Mar. 9, 1994, pp. 7–8.
*American Institute of Baking Bulletin*, "Frozen Bakery Products, Blast Freezing." No. 173, Jan., 1975, p. 43.
*Baking and Snack*, "Technology for today's 'hot' products." Mat, 1991, pp. 16–17.
Chamberlain, Ross. *Quick Frozen Foods*, "Frozen Hard–Roll Products Pave the Way To National Expansion for N.Y. Bakery." Dec. 1978, pp. 36–40.
Doerry, Wulf. *Research Department Technical Bulletin, American Institute of Baking*, "Egg Bagels." vol. XVI, Issue 11, Nov., 1994, pp. 1–6.
Dubois, Donald K. *Research Department Technical Bulletin, American Institute of Baking*, "Technical Assistance." vol. IX, Issue 1, Jan., 1987, pp. 1–8.
Evenson, Mary. *ASBE Proceedings*, "New Developments in Frozen Dough Technology." 1987, pp. 85–99.
*Frozen Bakery Products*, "Design for continuous freezing systems depends on knowing how products react." Jun. 16, 1987, pp. BE–40—BE–45.
Gorton, Laurie. *Baking and Snack Systems*, "Designing bagels for process, bake–off success." Jan., 1989, pp. 6–9.
Harder, Eulalia. "Blast Freezing System for Quality Foods." CPI Publishing, Boston, p. 105.
Hinton, Brian. *Bakers Journal*, "Bagel's Time has Come." Mar. 1990, pp. 20–21.
Meloan, Elaine, and Wulf T. Doerry. *Research Department Technical Bulletin, American Institute of Baking*, "Update on Bagel Technology." vol. X, Issue 4, Apr., 1988, pp. 1–9.
Petrofsky, Robert. *Research Department Technical Bulletin, American Institute of Baking*, "Bagel Production and Technology." vol. VIII, Issue 11, Nov., 1996, pp. 1–5.
Petrofsky, Bob. *ASBE Proceedings*, "Bagels." 1986, pp. 143–151.
*Quick Frozen Foods*, "Stainless Steel Belt Conveyors Offer Contamination Free Food Movement." Sep., 1962, pp. 110–112.
*Quick Frozen Foods*, "Fully Automated Pie Freezing System Produces 6,000 Units Per Hour." Apr., 1968, p. 53.
*Quick Frozen Foods*, "The Processing and Freezing of Wild Canadian Blueberries." Jan., 1963, pp. 38–41, 118.
*Quick Frozen Foods*, "Stainless Steel Belting Speeds Shrimp Through 3–Phase System." Sep., 1970, p. 45.
*Quick Frozen Foods*, "Belt Freezing of IQF Blueberries Lifts Quality, Speeds Production." Dec., 1962, pp. 107–108.
*Refrigeration Technology*, "Fundamentals of Food Freezing." AVI Publishing Co., Westport, Ct., pp. 40–49.
Reynolds, Patrick T. *Bakery Production and Marketing*, "Boiled and Frozen Bagels Go Global." Jan., 1993, pp. 106–113.
*The National Honey Board Food Technology Program*, "Honey Bagels." Bagels–Formula.
Thelen, Ray. *Retail Baking Today*, "Traditional and variety bagel production guidelines." Nov., 1976, pp. 33–34, 50.
Zimmerman, Art. *Quick Frozen Foods*, "Spiral Freezing System Weds Cost Efficiencies." Oct., 1984, pp. 40–43.

*Primary Examiner*—Lien Tran
*Attorney, Agent, or Firm*—Laff, Whitesel, Conte & Saret, Ltd.

[57] ABSTRACT

An improved bagel made by forming toroidal dough pieces, treating the surface of the dough pieces with a warmed acidic solution, and freezing. After storage in a frozen state, the dough pieces are thawed and baked to produce bagels at least as desirable as fresh bagels produced by conventional processes which do not use an intermediate freezing step.

31 Claims, No Drawings

PROCESS FOR MAKING FROZEN BAGEL SHAPES

BACKGROUND OF THE INVENTION

The present invention relates to bagels and bagel-making. More particularly, the present invention relates to preparing frozen toroidal-shaped dough pieces which, when thawed and baked, have organoleptic properties at least as desirable as fresh bagels produced by conventional boil and bake or steam and bake processes. The present invention relates as well to both the frozen dough pieces and the baked bagels prepared in accordance with the invention.

According to one legend, in 1683 in Vienna, Austria, a Jewish baker wanting to thank the King of Poland for protecting his countrymen from Turkish invaders, made special hard rolls in the shape of a riding stirrup—"bugels" in German—to commemorate the King's interest in horseback riding. The "bugels" eventually made their way from Poland and Austria to Russia, where they were sold on strings and said to bring good luck and possess magical powers. Over time, these toroidal or ring-shaped rolls came to be known as "bagels". At the turn of the century, bagels were brought to America by Eastern European Jewish immigrants. Since that time, bagels have become a staple food throughout the United States.

Traditionally, bagels have been made from a toroidal shaped yeast dough piece which is first placed in boiling water for 1–2 minutes, and then baked. Some years ago, steaming for a period of about 20–60 seconds began to be used in lieu of boiling. The boiling (or steaming) gelatinizes the surface of the dough piece to produce, after baking, a roll with a dense and chewy crumb and a relatively thick shiny crust. This gives bagels their unique mouthfeel and their other distinctive organoleptic properties. The dense and chewy crumb and relatively thick crust also makes bagels a bread product particularly suitable for use in making sandwiches.

In order to obtain uniform and economic bagels, it is desirable to make large quantities of frozen toroidal-shaped dough pieces at a central location for storage either at the manufacturing site or at an off-site location. The frozen dough pieces can then be shipped if necessary and thawed and baked as needed.

While methods for preparing frozen toroidal-shaped dough pieces for making bagels have been suggested in the past, prior bagels obtained after freezing, storage, thawing and baking have often not risen as much as desired and have had unduly thin and soft crusts and an unduly soft crumb. These prior frozen and baked bagels have also often been misshapen and have had unsightly blisters and surface holes, making them also visually undesirable.

Finally, although it is desirable to produce novel bagels incorporating whole and chopped secondary ingredients such as chocolate and carob chips, dried fruit (raisins, blueberries, etc.), dried vegetables, nuts, cookie bits, cheeses and candies, boil (or steam) and bake methods generally have limited the development of such novel bagels. It is often difficult if not impossible to form bagels from doughs containing such secondary ingredients since they interfere with shaping and closing or sealing of the toroidal bagel shape. Furthermore, certain sensitive secondary ingredients, if put in bagels produced by such conventional boil (or steam) and bake processes, would bleed or dissolve into or away from the doughs due to the temperature rise produced in the boiling or steaming step.

SUMMARY OF THE INVENTION

It is an object of the present invention to provide an improved and highly efficient process for preparing frozen toroidal dough pieces which, when thawed and baked, will have mouthfeel and other organoleptic properties at least as desirable as fresh bagels produced by conventional boil and bake or steam and bake processes, without an intermediate freezing step.

Yet another object of the present invention is to provide an improved process for preparing bagels which does not require a boiling or a steaming step prior to final baking.

Still another object of the present invention to provide from frozen toroidal dough pieces visually attractive bagels which are not misshapen or blistered and which do not have unsightly surface holes.

It is a further object of the present invention to provide a method of preparing bagels having a cake-like dense and moist crumb and particularly thick and crispy alligatored outer crusts.

A still further object of the present invention is to provide novel bagels incorporating whole or chopped secondary ingredients.

A yet further object of the present invention is to provide frozen toroidal dough pieces from which finished baked bagels can be obtained which are particularly well-adapted for use in making sandwiches.

Additional objects, advantages and novel features of the invention will be set forth in the description and claims which follow, will become apparent to those skilled in the art upon examination of the following, or may be learned by practice of the invention. The objects and advantages of the invention may be realized and attained by means of the instrumentalities and combinations particularly pointed out in the appended claims.

According to the present invention, the foregoing and other objects are attained by:

preparing a bagel dough;

forming the bagel dough into one or more toroidal-shaped dough pieces;

proofing the toroidal-shaped dough pieces;

bathing the toroidal-shaped dough pieces in an aqueous acidic solution warmed to a temperature below the boiling point of the aqueous acidic solution; and freezing the acid-treated, toroidal-shaped dough pieces. It is highly preferred but not required that the dough pieces be refrigerated after proofing to firm up the dough, making the dough pieces easier to manage.

In accordance with another aspect of the present invention, bagels are prepared by thawing the acid-treated, toroidal-shaped dough pieces produced as described above and then baking these thawed dough pieces, to produce a bagel at least as desirable as fresh bagels produced by conventional boil and bake processes.

DETAILED DESCRIPTION OF THE PREFERRED EMBODIMENTS OF THE INVENTION

The first step in practicing the method of the present invention is the preparation of a bagel dough. While any conventional bagel dough may be used in the practice of this invention, it is preferred that the bagel dough include the following ingredients, in the indicated levels, in percentages by weight of about:

| Ingredient | Broad Range | Preferred Level |
|---|---|---|
| flour | 50–70 | 61 |
| water | 25–35 | 29 |
| yeast | 1.2–0.4 | 0.6 |
| non-diastatic malt syrup (liquid) | 2.0–5.0 | 3.1 |
| non-diastatic malt syrup (powder) | 1.2–0.4 | 0.6 |
| sugar | 0.8–1.8 | 1.3 |
| molasses | 0.5–2.0 | 1.1 |
| salt | 0.7–2.0 | 1.4 |
| powdered egg whites | 0.8–1.8 | 1.3 |
| dough conditioner | 1.2–0.4 | 0.6 |

If secondary ingredients having significant amounts of moisture are used, less water should be added to the bagel dough mix. If the secondary ingredients tending to inhibit yeast activity are used, additional yeast will be included in the mixture. If hard secondary ingredients like nuts or dried fruits are used, the mixing time will be increased to better incorporate those ingredients into the dough. Finally, additional ingredients such as sugar may be added to complement certain secondary ingredients, such as blueberries or chocolate chips.

While flours other than unbleached enriched flours may be used to make the bagel dough, unbleached enriched flours are preferred. Bleached flours are less desirable because they produce a white crumb. The preferred enriched flour may contain, for example, unbleached flour, malted barley flour, reduced iron, niacin, thiamine mononitrate and riboflavin. It is preferred that the flour have a protein level (in percentage by weight) of about 11.0 to 14.2% and more preferred that the protein level be about 13.8 to 14.2%.

The dough conditioner in the above preferred bagel dough functions as an oxidizer during baking. For example, dough conditioners comprising mixtures of L-cysteine, ascorbic acid and fungal and cereal enzymes which are available commercially from many sources, including, for example, Elf Atochem of Minneapolis, Minn., Puratos of Cherryhill, N.J., Archer Daniels Midland Co. of Decatur, Ill., and Caravan Products of Totowa, N.J. may be used. One such dough conditioner is described in U.S. Pat. No. 3,934,040.

The ingredients will be mixed in a manner recognized by those skilled in the art to make a conventional dough for bagel-making. For example, the above ingredients, when used in the most preferred ranges, will be mixed from about 8.5 to 11 minutes to produce a dough having a temperature after mixing of approximately 80°–90° F.

The bagel dough, as described above, is divided and formed into toroidal-shaped dough pieces. It is preferred that the dough pieces be formed immediately after completion of the mixing process. Also, although the toroidal shapes may be made by hand, in commercial scale operations it is contemplated that the shapes will be made using conventional high speed automatic bagel-forming machines.

Once formed, the toroidal-shaped dough pieces should be proofed. Proofing may be carried out from about 20 to 60 minutes at about 90° to 105° F. under conditions of about 75 to 90% relative humidity. It is preferred that the proofing be carried out for from about 30 to 40 minutes at about 95° to 100° F. and at about 80 to 85% relative humidity. It is most preferred that the proofing be carried out for about 30 to 35 minutes at about 100° F. in a conventional proofing cabinet maintained at about 85% relative humidity.

After proofing, it is highly preferred but not required that the dough pieces be refrigerated to firm up the dough, making the dough pieces easier to manage. Refrigeration may be accomplished, for example, by quick-chilling to about 38°–40° F. for about 30 minutes to one hour.

After proofing (and optional preferred chilling), the toroidal-shaped dough pieces are treated with a heated aqueous acidic solution. Typically, the aqueous acidic solution should be maintained at a temperature of about 140° to 190° F., more preferably at about 160° to 185° F., and most preferably at about 170°–180° F. The pH of this solution should be from about pH 3.0 to 6.0, more preferably from about pH 3.5 to 5.0, and most preferably at about pH 4.0 to 4.5.

The acidic aqueous solution should be heated to a temperature below its boiling point. This warm, acidic surface treatment is believed to gelatinize the surface of the dough pieces without adversely affecting the yeast viability inside the dough piece. This is in contrast to conventional boiling or steaming of bagel dough in which the surface starch is gelatinized by the boiling water or steam restricting later expansion of the dough piece and killing the yeast. Thus, when the present dough pieces are baked, the heat penetrates faster than in boiled or steamed dough pieces, aerating the dough and making it more porous. Faster heat penetration also gives a crisper crust and makes the crumb more open and the bagel less dense.

Any food-grade acid which does not break down at the temperature chosen may be used, including, for example, acetic, lactic, or fumaric acid. Vinegar (aqueous acetic acid) is the preferred acid.

The toroidal-shaped dough pieces will be bathed in the aqueous acidic solution for from about 15 to 40 seconds, more preferably from about 20 to 35 seconds, and most preferably for about 25–30 seconds or until they float to the surface.

The toroidal-shaped dough pieces are then removed from the aqueous acidic solution and sprayed with clear water. The water should be cool, preferably in the range of about 35° to 50° F. and more preferably in the range of about 38°–42° F. After this spraying step, the toroidal shapes may be dusted with ground cornmeal (preferably medium fine ground) and flipped over so that they rest on the dusted side. This facilitates handling of the shapes which will be sticky on the uncoated surfaces.

The toroidal-shaped dough pieces are then transported to a first freezer. The first freezer should be maintained at a temperature of at least about −15° F., and preferably at least about −20° F. A blast freezer is particularly preferred because it cools the bagel shapes with minimum damage to the yeast cells in the dough which must be available to generate gas in the later thawing and baking steps. Also, a blast freezer accomplishes cooling in a minimal amount of time, which is highly desirable from a practical manufacturing standpoint.

It is preferred that the moisture on the surface of the bagel shapes be maintained during the freezing step. That is, the moisture remaining on the surface of the dough pieces after the water wash preferably will not be removed. Thus, when a blast freezer is used as the "first freezer", a pre-freezer may be employed to insure that the surface moisture is frozen in place before the dough pieces enter the blast freezer. Retention of this surface moisture further improves the crispness of the crust in the final baked bagel.

The toroidal-shaped dough pieces should remain in the first freezer until they are cooled to at least about 10° F. at the core. It has been found that this will take about 35–40 minutes. After this, they may be packaged and stored in a second freezer at about 0° F. for up to 60 days, but preferably no longer than 45 days.

When it is desired to produce bagels from the frozen toroidal-shaped dough pieces, the frozen dough pieces should be thawed under controlled conditions. In one preferred embodiment, they will be thawed by refrigerating for from about 8–16 hours at about 38°–42° F. and about 65% relative humidity and then heated for about 15 minutes at about 90° F. and about 75% relative humidity to achieve a core temperature of about 65°–70° F. Of course, different times and temperatures may be used, although in all cases at least about 6 hours of thawing under such controlled conditions will be required. This insures that fermentation by the yeast and oxidation of gluten in the dough piece begins before initiation of the baking step to aid regular expansion of the dough pieces in the baking step.

Once the desired core temperature is reached, the toroidal-shaped dough pieces are ready for baking. This may be done by any conventional method. It is preferred that the dough pieces be baked at about 425°–525° F. and preferably at about 450°–500° F. for about 10–14 minutes, with about eight seconds of steam addition at the outset. Steam addition over about 5–15 seconds may be used with about 6–12 seconds being preferred. Baking time depends on the size of the dough pieces, the presence or absence of whole or chopped ingredients, the amount or number of bagels being baked, the altitude, and sugar levels in the dough pieces.

The following examples are presented in order to illustrate the present invention, but nothing therein should be taken as limiting the scope thereof:

EXAMPLES

Example 1

Frozen bagel dough shapes were prepared in accordance with the invention as follows: First, a bagel dough was prepared by combining the following ingredients in a Hobart mixer with a stainless steel mixing bowl and dough hook on second speed.

| Ingredient | Percentage By Weight |
| --- | --- |
| unbleached enriched flour | 61 |
| water | 29 |
| yeast | 0.6 |
| non-diastatic malt syrup (liquid) | 3.1 |
| non-diastatic malt syrup (powder) | 0.6 |
| sugar | 1.3 |
| molasses | 1.1 |
| salt | 1.4 |
| powdered egg whites | 1.3 |
| dough conditioner | 0.6 |

In preparing the dough, the water was placed in the mixing bowl followed by the other ingredients which were stirred until uniformly mixed. The ingredients were mixed for a total of about 10 minutes to produce a dough having a temperature after mixing of approximately 85° F. The bagel dough was divided into toroidal-shaped dough pieces immediately after completion of the mixing process using a conventional high speed automatic bagel-forming machine. The enriched flour included unbleached flour, malted barley flour, reduced iron, niacin, thiamine mononitrate, and riboflavin, and a protein level, in percentage by weight, of about 14.0%. The dough conditioner comprised a mixture of L-cysteine, ascorbic acid, and fungal and cereal enzymes.

Once formed, the toroidal-shaped dough pieces were proofed for about 30–35 minutes at about 100° F. in a conventional proofing cabinet maintained at about 85% relative humidity. The proofed, toroidal-shaped dough pieces were then quick-chilled to about 38°–40° F. for about 45 minutes.

Next, an aqueous solution of acetic acid was prepared in a vat with sufficient acetic acid (200 grain vinegar) to achieve a pH of about 4.0 to 4.5. The vat of acidic aqueous solution was heated to about 170°–180° F. whereupon the toroidal-shaped dough pieces were bathed in the vat for about 25–30 seconds. It was found that the dough pieces initially sank to the bottom of the vat but, after being in the bath for about 25–30 seconds, they floated to the surface.

The acid-treated dough pieces were then removed from the acidic bath and sprayed with clear water at a temperature of about 40° F. The toroidal shapes were then placed on a flat tray, dusted with medium fine ground cornmeal, and flipped over so that they rested on the dusted side.

The tray containing the bagel shapes was then transported to a first freezer maintained at a temperature of about −20° F. The dough pieces remained in the first freezer until they cooled to at least about 10° F. at the core, which took about 35–40 minutes. The resulting frozen dough pieces were packaged and stored at about 0° F.

Example 2

After storage for several days, the frozen dough pieces of Example 1 were thawed for about 10 hours in a refrigerated room at about 40° F. and 65% relative humidity and then heated for about 15 minutes at about 90° F. and about 75% relative humidity, thereby achieving a core temperature of about 65°–70° F. The thawed dough pieces were then baked at about 500° F. for about 12 minutes, with about 10 seconds of steam injection at the beginning of the baking cycle. The resulting baked bagels were visually attractive and not misshapen or blistered, and were free of surface holes. The bagels had a cake-like, dense and moist crumb and a particularly thick and crispy alligatored outer crust. Some of the bagels were cut and found to have a short bite, making them well-suited for use in preparing sandwiches.

Example 3

The procedure described in Example 1 were used in making novel bagels incorporating blueberries. The dough was prepared from the ingredients used in Example 1 except for the addition of dehydrated blueberries and sufficient sugar to produce a sweet product. Once formed, proofed and frozen bagels were thawed and baked as described in Example 2. The resulting baked product was tasty and had well-defined and juicy blueberries which had neither bled nor dissolved into or away from the bagel crumb.

While the present invention is described above in connection with the preferred or illustrative embodiments, those embodiments are not intended to be exhaustive or limiting of the invention. Rather, the invention is intended to cover any alternatives, modifications or equivalents that may be included within its sphere and scope, as defined by the appended claims.

What we claim is:

1. An improved process for preparing frozen bagel dough shapes having organoleptic properties, when defrosted and baked, at least as desirable as fresh bagels produced by conventional boil and bake processes comprising:

preparing a bagel dough;

forming the bagel dough into one or more toroidal-shaped dough pieces;

proofing the toroidal-shaped dough pieces;

bathing the toroidal-shaped dough pieces in an aqueous food grade acidic solution warmed to a temperature up to about 190° F.; and freezing the acid-treated, toroidal-shaped dough pieces.

2. The method of claim 1 in which the bagel dough is prepared by combining the following ingredients, in percentages by weight:

| flour | about 50–70 |
|---|---|
| water | about 25–35 |
| yeast | about 1.2–0.4 |
| liquid non-diastatic malt syrup | about 2.0–5.0 |
| powder non-diastatic malt syrup | about 1.2–0.4 |
| sugar | about 0.8–1.8 |
| molasses | about 0.5–2.0 |
| salt | about 0.7–2.0 |
| powdered egg whites | about 0.8–1.8 |
| dough conditioner | about 1.2–0.4 |

3. The process of claim 1 in which the bagel dough is made from flour having a protein level of about 11.0% to 14.2% by weight.

4. The process of claim 1 in which the bagel dough is made from flour having a protein level of about 13.8% to 14.2% by weight.

5. The method of claim 1 in which the proofing is carried out for from about 20 to 60 minutes at about 90° to 105° F. and about 75 to 90% relative humidity.

6. The method of claim 1 in which the proofing is carried out for from about 30 to 40 minutes at about 95° to 100° F. and about 80 to 85% relative humidity.

7. The method of claim 1 in which the proofing is carried out for from about 30 to 35 minutes at about 100° F. and about 85% relative humidity.

8. The method of claim 1 in which, after the toroidal-shaped dough pieces are proofed, they are refrigerated.

9. The method of claim 1 in which, after the toroidal-shaped dough pieces are proofed, they are refrigerated at about 38°–40° F. for about 30–60 minutes.

10. The method of claim 1 in which the aqueous acidic solution is maintained at a temperature of about 140° to 190° F.

11. The method of claim 1 in which the aqueous acidic solution is maintained at a temperature of about 160° to 185° F.

12. The method of claim 1 in which the aqueous acidic solution is maintained at a temperature of about 170° to 180° F.

13. The method of claim 1 in which the dough pieces are bathed in an aqueous acidic solution maintained at a pH of about 3.0 to 6.0.

14. The method of claim 1 in which the dough pieces are bathed in an aqueous acidic solution maintained at a pH of about 3.5 to 5.0.

15. The method of claim 1 in which the acidic aqueous solution is at a pH of about 4.0 to 4.5.

16. The method of claim 1 in which the toroidal-shaped dough pieces are bathed in the aqueous acidic solution for about 15 to 40 seconds.

17. The method of claim 1 in which the toroidal-shaped dough pieces are bathed in the aqueous acidic solution for about 20 to 35 seconds.

18. The method of claim 1 in which the toroidal-shaped dough pieces are bathed in the aqueous acidic solution for about 25 to 30 seconds.

19. The method of claim 1 in which, after bathing the toroidal-shaped dough pieces, they are sprayed with clear water.

20. The method of claim 19 in which the clear water is at a temperature in the range of about 35° to 50° F.

21. The method of claim 1 in which, after bathing the toroidal-shaped dough pieces, they are placed in a freezer at a temperature of at least about −15° F. and held there until they are cooled to at least about 10° F. at the core.

22. The method of claim 21 in which the freezer is a blast freezer.

23. The method of claim 22 in which a pre-freezer is used ahead of the freezer to freeze the moisture on the surface of the dough pieces before they enter the blast freezer.

24. An improved process for preparing bagels from frozen bagel dough shapes comprising:

preparing a bagel dough;

forming the bagel dough into one or more toroidal-shaped dough pieces;

proofing the toroidal-shaped dough pieces;

bathing the toroidal-shaped dough pieces in an aqueous food grade acidic solution warmed to a temperature up to about 190° F.;

freezing the acid-treated, toroidal-shaped dough pieces;

thawing the frozen toroidal-shaped dough pieces; and baking with steam addition.

25. The method of claim 24 in which the frozen toroidal-shaped dough pieces are thawed by refrigerating for about 6 hours and then heated to achieve a core temperature of about 65°–70° F.

26. The method of claim 24 in which the frozen bagel pieces are thawed by refrigerating for about 8–16 hours at about 38°–42° F. and about 65% relative humidity and then heated for about 15 minutes at about 90° F. and about 75% relative humidity.

27. The method of claim 24 in which the thawed toroidal-shaped dough pieces are baked at about 500° F. for about 10–14 minutes.

28. The method of claim 24 in which the steam is added for a period of about 5 to 15 seconds.

29. The method of claim 24 in which the steam is added for a period of about 6 to 12 seconds.

30. The method of claim 24 in which the steam is added for a period of about 8 seconds.

31. An improved process for preparing frozen bagel dough shapes having organoleptic properties, when defrosted and baked, at least as desirable as fresh bagels produced by conventional boil and bake processes comprising:

preparing a bagel dough from the following ingredients in percentages by weight, in which the flour has a protein level of about 11.0 to 14.2% by weight:

| flour | about 50–70 |
|---|---|
| water | about 25–35 |
| yeast | about 1.2–0.4 |
| liquid non-diastatic malt syrup | about 2.0–5.0 |
| powder non-diastatic malt syrup | about 1.2–0.4 |
| sugar | about 0.8–1.8 |
| molasses | about 0.5–2.0 |
| salt | about 0.7–2.0 |
| powdered egg whites | about 0.8–1.8 |
| dough conditioner | about 1.2–0.4 | forming the bagel dough into one or more toroidal-shaped dough pieces;

proofing the toroidal-shaped dough pieces for from about 20 to 60 minutes at about 90°–105° F. and about 75–90% relative humidity;

refrigerating the proofed toroidal-shaped dough pieces;

bathing the toroidal-shaped dough pieces in an aqueous food grade acid solution at a temperature of about 140°–190° F. and a pH of about 3.0 to 6.0; and freezing the acid-treated, toroidal-shaped dough pieces.

* * * * *